United States Patent
Corda et al.

(10) Patent No.: US 8,811,971 B2
(45) Date of Patent: Aug. 19, 2014

(54) MOBILE COMMUNICATION DEVICE AND METHOD FOR DISABLING APPLICATIONS

(75) Inventors: Alexandre Corda, Nice (FR); Ismaila Wane, Tucson, AZ (US)

(73) Assignee: NXP B.V., Eindhoven (NL)

( * ) Notice: Subject to any disclaimer, the term of this patent is extended or adjusted under 35 U.S.C. 154(b) by 903 days.

(21) Appl. No.: 12/670,687

(22) PCT Filed: Jul. 21, 2008

(86) PCT No.: PCT/IB2008/052924
§ 371 (c)(1),
(2), (4) Date: Aug. 30, 2010

(87) PCT Pub. No.: WO2009/016540
PCT Pub. Date: Feb. 5, 2009

(65) Prior Publication Data
US 2010/0330958 A1 Dec. 30, 2010

(30) Foreign Application Priority Data

Aug. 1, 2007 (EP) ................................. 07290963

(51) Int. Cl.
*H04M 3/00* (2006.01)
(52) U.S. Cl.
USPC ........... 455/420; 455/574; 455/558; 455/411; 380/274; 713/189; 713/154
(58) Field of Classification Search
CPC ....... H04L 67/04; H04L 67/125; H04L 63/10; G06F 2221/2143; G06F 21/88; G06F 21/79
USPC .......... 379/193; 455/410, 411, 418, 419, 420, 455/466, 456.1, 456.6, 574, 558, 550.1; 726/27; 713/193, 194, 189, 154; 380/201, 274; 340/5.31; 711/152
See application file for complete search history.

(56) References Cited

U.S. PATENT DOCUMENTS

| | | | |
|---|---|---|---|
| 6,275,825 B1 * | 8/2001 | Kobayashi et al. | 707/737 |
| 6,516,064 B1 | 2/2003 | Osawa et al. | |
| 6,526,010 B1 | 2/2003 | Morioka et al. | |
| 7,539,156 B2 | 5/2009 | Leung et al. | |
| 7,769,394 B1 * | 8/2010 | Zhu | 455/456.1 |

(Continued)

FOREIGN PATENT DOCUMENTS

| | | |
|---|---|---|
| CN | 2798474 Y | 7/2006 |
| EP | 1521160 A2 | 4/2005 |

(Continued)

OTHER PUBLICATIONS

NXP; "MF1ICS50 Functional Specification"; Jan. 29, 2008; 19 Pages; Retrieved From Internet Feb. 12, 2009.

(Continued)

*Primary Examiner* — Mahendra Patel

(57) ABSTRACT

A mobile communication device (1) is connectable to a memory device (MIF) that comprises a plurality of memory-sectors (0-F), wherein at least one application is stored in at least one memory sector. the memory sectors are protected against unauthorized access 5 by sector keys (key A, key B, 4). The mobile communication device (1) comprises an applications manager (MAM) being adapted to disable the stored applications (TK1, AC1, AC2, TR2, TR3, CP1, TR4, AC3, TK3) when triggered by an external trigger event.

20 Claims, 3 Drawing Sheets

(56) References Cited

U.S. PATENT DOCUMENTS

| | | | |
|---|---|---|---|
| 7,860,486 B2* | 12/2010 | Frank et al. | 455/410 |
| 7,865,141 B2* | 1/2011 | Liao et al. | 455/41.2 |
| 2003/0045328 A1 | 3/2003 | Natsuno | |
| 2003/0065934 A1 | 4/2003 | Angelo et al. | |
| 2004/0140351 A1* | 7/2004 | Flugge et al. | 235/382 |
| 2005/0044404 A1 | 2/2005 | Bhansali et al. | |
| 2005/0186954 A1* | 8/2005 | Kenney | 455/420 |
| 2006/0075263 A1 | 4/2006 | Taylor | |
| 2006/0079204 A1* | 4/2006 | Pon et al. | 455/411 |
| 2006/0212664 A1 | 9/2006 | Takaragi | |
| 2007/0014403 A1* | 1/2007 | Loo et al. | 380/201 |
| 2007/0038680 A1* | 2/2007 | Casey | 707/201 |
| 2007/0099679 A1* | 5/2007 | Saarisalo | 455/574 |
| 2007/0106907 A1* | 5/2007 | Rainsard et al. | 713/189 |
| 2007/0283145 A1* | 12/2007 | Gressel et al. | 713/164 |
| 2008/0109899 A1* | 5/2008 | Rijnswou Van et al. | 726/21 |
| 2008/0148042 A1* | 6/2008 | Brown et al. | 713/154 |
| 2008/0293397 A1* | 11/2008 | Gajdos et al. | 455/420 |
| 2009/0028335 A1* | 1/2009 | van de Groenendaal | 380/274 |
| 2009/0204824 A1* | 8/2009 | Lin et al. | 713/193 |
| 2010/0291896 A1* | 11/2010 | Corda | 455/410 |

FOREIGN PATENT DOCUMENTS

| | | |
|---|---|---|
| JP | 05-204762 A | 8/1993 |
| JP | 2003-076968 A | 3/2003 |
| JP | 2003-244344 A | 8/2003 |
| JP | 2004-005149 A | 1/2004 |
| WO | 00/45243 A1 | 8/2000 |
| WO | 2004114698 A1 | 12/2004 |
| WO | 2006122700 A2 | 5/2006 |
| WO | 2006/135907 A | 12/2006 |
| WO | 2007/055558 A1 | 5/2007 |
| WO | 2007055558 A1 | 5/2007 |

OTHER PUBLICATIONS

International Search Report for PCT/IB2008/052924 dated Mar. 3, 2009.

* cited by examiner

| Sector | Block | Byte Number within a Block | Description |
|---|---|---|---|
| | | 0 1 2 3 4 5 6 7 8 9 10 11 12 13 14 15 | |
| 15 | 3 | Key A  Access Bits  Key B | Sector Trailer 15 |
| | 2 | | Data |
| | 1 | | Data |
| | 0 | | Data |
| 14 | 3 | Key A  Access Bits  Key B | Sector Trailer 14 |
| | 2 | | Data |
| | 1 | | Data |
| | 0 | | Data |
| ⋮ | ⋮ | | |
| 1 | 3 | Key A  Access Bits  Key B | Sector Trailer 1 |
| | 2 | | Data |
| | 1 | | Data |
| | 0 | | Data |
| 0 | 3 | Key A  Access Bits  Key B | Sector Trailer 0 |
| | 2 | | Data |
| | 1 | | Data |
| | 0 | | Manufacturer Block |
Fig. 1
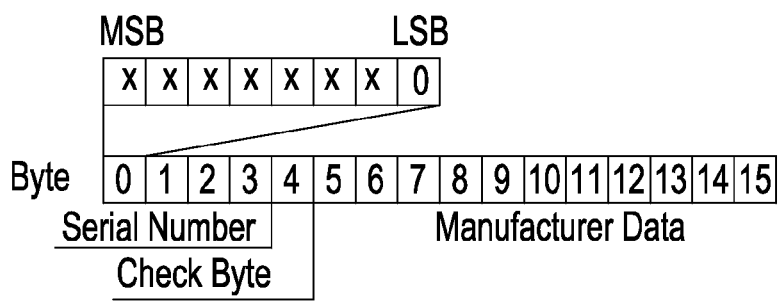
Fig. 2
Fig. 3

MOBILE COMMUNICATION DEVICE AND METHOD FOR DISABLING APPLICATIONS

FIELD OF THE INVENTION

The invention relates to a mobile communication device being connectable to a memory device comprising a plurality of memory sectors, wherein at least one application is stored in at least one memory sector, wherein the memory sectors are protected against unauthorized access by sector keys.

The invention further relates to a method for disabling applications in a mobile communication device that is connected to a memory device comprising a plurality of memory sectors wherein the sectors are protected against unauthorized access by sector keys, wherein each application is stored in at least one memory sector.

The invention further relates to a computer program product being directly loadable into the memory of a mobile communication device being connectable to a memory device comprising a plurality of memory sectors wherein at least one application is stored in at least one memory sector, wherein the memory sectors are protected against unauthorized access by sector keys.

The invention further relates to a telecommunication system comprising a Mobile Network Operator, a plurality of mobile communication devices and a Trusted Service Manager.

BACKGROUND OF THE INVENTION

The MIFARE® classic family, developed by NXP Semiconductors is the pioneer and front runner in contactless smart card ICs operating in the 13.56 MHz frequency range with read/write capability. MIFARE® is a trademark of NXP Semiconductors. MIFARE complies with ISO14443 A, which is used in more than 80% of all contactless smart cards today. The technology is embodied in both cards and card reader devices. MIFARE cards are being used in an increasingly broad range of applications (including transport ticketing, access control, e-payment, road tolling, and loyalty applications). MIFARE Standard (or Classic) cards employ a proprietary high-level protocol with a proprietary security protocol for authentication and ciphering. MIFARE® technology has become a standard for memory devices with key-protected memory sectors. One example for a published product specification of MIFARE® technology is the data sheet "MIFARE®Standard Card IC MF1 IC S50-Functional Specification" (1998) which is herein incorporated by reference. MIFARE® technology is also discussed in: Klaus Finkenzeller, "RFID Handbuch", HANSER, $3^{rd}$ edition (2002).

The MIFARE Classic cards are fundamentally just memory storage devices, where the memory is divided into sectors and blocks with simple security mechanisms for access control. Each device has a unique serial number. Anticollision is provided so that several cards in the field may be selected and operated in sequence.

The MIFARE Standard 1 k offers about 768 bytes of data storage, split into 16 sectors with 4 blocks of 16 bytes each (one block consists of 16 byte); each sector is protected by two different keys, called A and B. They can be programmed for operations like reading, writing, increasing value blocks, etc. The last block of each sector is called "trailer", which contains two secret keys (A and B) and programmable access conditions for each block in this sector. In order to support multi-application with key hierarchy an individual set of two keys (A and B) per sector (per application) is provided.

The memory organization of a MIFARE Standard 1 k card is shown in FIG. 1. The 1024×8 bit EEPROM memory is organized in 16 sectors with 4 blocks of 16 bytes each. The first data block (block 0) of the first sector (sector 0) is the manufacturer block which is shown in detail in FIG. 2. It contains the serial number of the MIFARE card that has a length of four bytes (bytes 0 to 3), a check byte (byte 4) and eleven bytes of IC manufacturer data (bytes 5 to 15). The serial number is sometimes called MIFARE User IDentification (MUID) and is a unique number. Due to security and system requirements the manufacturer block is write protected after having been programmed by the IC manufacturer at production. However, the MIFARE specification allows to change the serial number during operation of the MIFARE card, which is particularly useful for MIFARE emulation cards like SmartMX cards.

SmartMX (Memory eXtension) is a family of smart cards that have been designed by NXP Semiconductors for high-security smart card applications requiring highly reliable solutions, with or without multiple interface options. Key applications are e-government, banking/finance, mobile communications and advanced public transportation.

The ability to run the MIFARE protocol concurrently with other contactless transmission protocols implemented by the User Operating System enables the combination of new services and existing applications based on MIFARE (e.g. ticketing) on a single Dual Interface controller based smart card. SmartMX cards are able to emulate MIFARE Classic devices and thereby makes this interface compatible with any installed MIFARE Classic infrastructure. The contactless interface can be used to communicate via any protocol, particularly the MIFARE protocol and self defined contactless transmission protocols. SmartMX enables the easy implementation of state-of-the-art operating systems and open platform solutions including JCOP (the Java Card Operating System) and offers an optimized feature set together with the highest levels of security. SmartMX incorporates a range of security features to counter measure side channel attacks like DPA, SPA etc. A true anticollision method (acc. ISO/IEC 14443-3), enables multiple cards to be handled simultaneously.

Building on the huge installed base of the MIFARE® interface platform, SmartMX enables e.g. Service Providers to introduce even more convenient ticketing systems and payment concepts. The high security (PKI and 3-DES) and the extended functionality of SmartMX allows for the integration of loyalty concepts, access to vending machines, or using an e-purse to pay fares instead of pre-paid electronic ticketing. The essential features of SmartMX cards are the following:

Contact interface UART according to ISO 7816.
Contactless interface UART according to ISO 14443.
Exception sensors for voltage, frequency and temperature.
Memory management unit.
MIFARE® classic emulation.
JavaCard Operating System.
DES and/or RSA engine.
Up to 72 kilobyte EEPROM memory space.

It should be noted that the emulation of MIFARE Classic cards is not only restricted to SmartMX cards, but there may also exist other present or future smartcards being able to emulate MIFARE Classic cards.

Recently, mobile communication devices have been developed which contain or are connectable to memory devices comprising a plurality of memory sectors, wherein the memory sectors are protected against unauthorized access by sector keys. Examples of such memory devices comprise MIFARE Classic cards or emulated MIFARE Classic devices like SmartMX cards. These mobile communication devices are e.g. configured as mobile phones with Near Field Communication (NFC) capabilities. Mobile communication devices that are equipped with the above explained memory devices can be used for multi-application purposes. I.e. it is possible to install a plurality of applications, like tickets, coupons, access controls and so on in one memory device. Each application is stored in one or more separate sector(s) of the memory device such that terminal readers are only able to read those applications that are stored in sectors with the sector keys being known by the terminal readers.

While this protection concept works well as long as the owner of the mobile communication device is in possession of the same there is a potential security risk if the mobile communication device is stolen. Let us assume that the mobile communication device that has been stolen is a mobile phone. In this case the user when becoming aware of the theft will immediately inform the Mobile Network Operator that his mobile phone has been lost or stolen, whereupon the Mobile Network Operator can remotely block its basic network services for this mobile phone. However, the applications stored in the memory device are still available for use at the terminal readers since these terminal readers do not identify the actual user of the mobile phone. This represents an important security issue that needs to be addressed before NFC value-added services are deployed by Mobile Network Operators.

OBJECT AND SUMMARY OF THE INVENTION

It is an object of the invention to provide a mobile communication device of the type defined in the opening paragraph and a method of the type defined in the second paragraph, in which the problems mentioned above are overcome.

In order to achieve the object defined above, with a mobile communication device according to the invention characteristic features are provided so that such a mobile communication device can be characterized in the way defined below, that is:

A mobile communication device (1) being connectable to a memory device (MIF) comprising a plurality of memory sectors (0-F), wherein at least one application is stored in at least one memory sector, wherein the memory sectors are protected against unauthorized access by sector keys (key A, key B, 4), wherein the mobile communication device (1) comprises an applications manager (MAM) being adapted to disable the stored applications (TK1, AC1, AC2, TR2, TR3, CP1, TR4, AC3, TK3) when triggered by an external trigger event.

A mobile communication device comprising a classic or emulated MIFARE memory, a swap memory and a MIFARE applications manager being adapted to swap MIFARE applications between the MIFARE memory and the swap memory.

In order to achieve the object defined above, with a method according to the invention characteristic features are provided so that a method according to the invention can be characterized in the way defined below, that is:

A method for disabling applications in a mobile communication device (1) that is connected to a memory device (MIF) comprising a plurality of memory sectors (0-F) wherein the sectors are protected against unauthorized access by sector keys (key A, key B, 4), wherein each application is stored in at least one memory sector (0-F), wherein the method comprises disabling the stored applications (TK1, AC1, AC2, TR2, TR3, CP1, TR4, AC3, TK3) when triggered by an external trigger event.

In order to achieve the object defined above, a computer program product being directly loadable into the memory of a mobile communication device being connectable to a memory device comprising a plurality of memory sectors wherein at least one application is stored in at least one memory sector, wherein the memory sectors are protected against unauthorized access by sector keys, comprises software code portions for performing—when running on the mobile communication device—the steps of the method according to the above paragraph.

In order to achieve the object defined above, a telecommunication system comprises a Mobile Network Operator, a plurality of mobile communication devices as defined above and a Trusted Service Manager, wherein the Trusted Service Manager is adapted to establish communication with a mobile communication device by request of the Mobile Network Operator and to instruct the mobile communication device to disable applications being stored in a memory device that is connected to the mobile communication device.

The present invention provides a mechanism to remotely disable all applications stored in said memory with protected memory sectors and thereby closes a potential security hole in using such value-added applications. The present invention is particularly useful in conjunction with memory devices being implemented as MIFARE Classic cards or emulated MIFARE Classic devices and the applications being implemented as MIFARE applications such as tickets, coupons, access controls, etc.

The invention allows to trigger application disabling from external sources, e.g. the Mobile Network Operators. However, in order to provide improved security levels it is preferred that a Trusted Service Manager establishes a communication link to the mobile communication device and instructs it to disable the stored applications.

According to the present invention there are three alternative approaches how to disable the stored applications. In a first embodiment disabling the stored applications comprises erasing the applications from the memory device. Erasing can be done by rewriting the respective sectors of the memory device with empty information or random data. While this solution provides high security and all application will be disabled without any possibility for restoring them, the speed of this erasing procedure can be a potential problem, if the new user (in case of a stolen mobile phone the thief) quickly interrupts the disabling routine by removing the battery from the mobile phone, for example, thereby keeping some of the stored applications "alive". Hence, the conclusion is that the disabling routine should work as fast as possible.

Another embodiment of the present invention provides a faster disabling routine compared with the first one. This second disabling approach comprises disabling the stored applications by scrambling the applications in the memory device, preferably by writing random information at random locations of the respective sectors of the memory device. This disabling method is very fast but is not 100% secure. Some important data could remain in the memory device since the applications are only left in an unusable state, but are not completely removed from the memory device.

A third embodiment of the invention combines both high processing speed and security by disabling the stored applications by means of changing the sector keys of the memory device. This disabling method is fast, since just the sector keys have to be re-written (if MIFARE memory devices are used the sector trailer), and 100% secure because all the sectors of the memory device will be un-accessible by Terminal Readers.

The present invention is perfectly suited for mobile phones with NFC capabilities that can be equipped with memory devices having multiple memory sectors protected by sector keys, such as (emulated) MIFARE devices, like SmartMX cards.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to them. The exemplary embodiments comprise memory devices being configured as MIFARE devices.

FIG. 1 shows the memory organization of a MIFARE Standard 1 k EEPROM.

FIG. 2 shows the manufacturer block of a MIFARE memory.

FIG. 3 shows the sector trailer of a sector of MIFARE memory.

DESCRIPTION OF EMBODIMENTS

Figure 4:
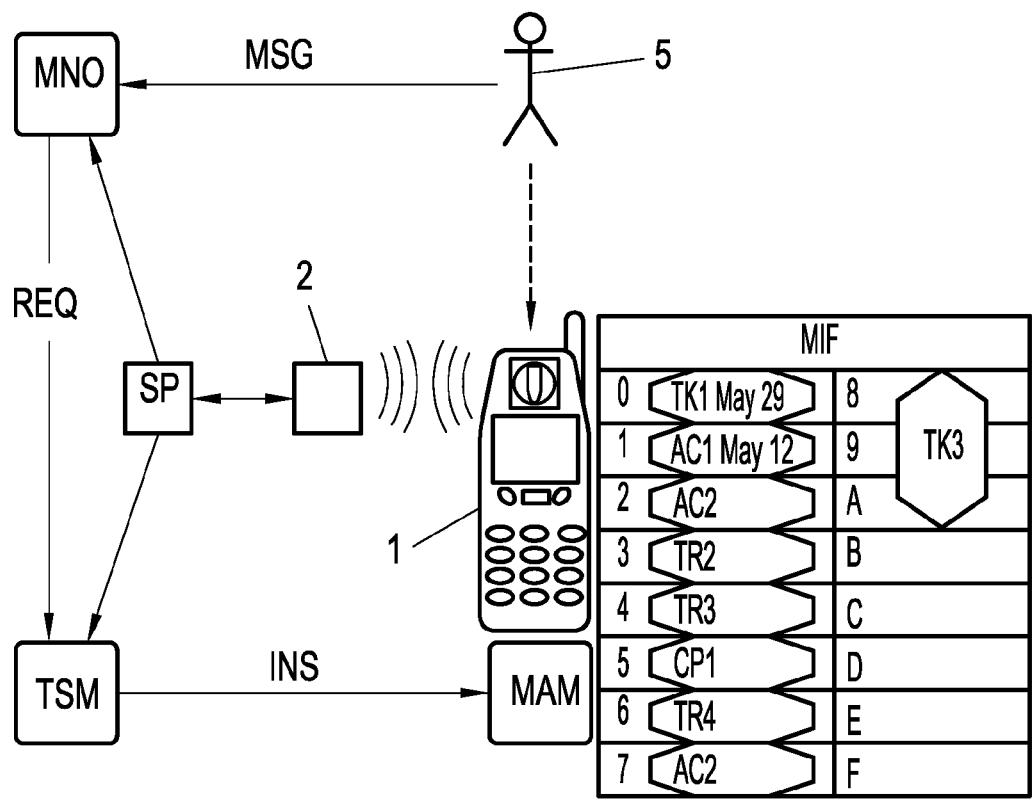
FIG. 4 shows a telecommunication system in which the present invention is implemented.

Referring to FIG. 4 a telecommunication system according to the present invention is explained. This system comprises a Mobile Network Operator MNO providing the full range mobile services to customers, particularly providing UICC and NFC terminals plus Over The Air (OTA) transport services. In FIG. 4 one user 5 is shown who is the owner of a mobile communication device 1 being configured as a NFC mobile phone. The customer uses the mobile communication device 1 for mobile communications and Mobile NFC services. In order to use the Mobile NFC services reader terminals 2 are necessary being adapted to wirelessly communicating with the mobile communication device 1. reader terminals 2 are operated under the influence of Service Providers. The customer subscribes to a MNO and uses Mobile NFC services. Mobile NFC is defined as the combination of contactless services with mobile telephony, based on NFC technology. The mobile phone with a hardware-based secure identity token (the UICC) can provide the ideal environment for NFC applications. The UICC can replace the physical card thus optimising costs for so called Service Provider, and offering users a more convenient service. The Mobile Network Operator MNO communicates with a Trusted Service Manager TSM who securely distributes and manages services to the MNO customer base. Also shown in FIG. 4 is a Service Provider (SP) who provides contactless services to the user 5 (SPs are e.g. banks, public transport companies, loyalty programs owners etc.). The Trusted Service Manager TSM will also securely distribute and manage the Service Providers' services to the MNO customer base. For the explanation of the present invention it is convenient to assume that the Mobile Network Operator MNO also acts as a Service Provider. The role of the Trusted Service Manager TSM is to provide the single point of contact for the Service Providers SP (herein also the Mobile Network Operator MNO) to access their customer base through the MNOs. The Trusted Service Manager TSM further manages the secure download and life-cycle management of Mobile NFC applications on behalf of the Service Providers. The Trusted Service Manager TSM does not participate in the transaction stage of the service, thus ensuring that the Service Providers' existing business models are not disrupted. Depending on the national market needs and situations, the Trusted Service Manager TSM can be managed by one or a consortium of Mobile Network Operators MNO, or by independent Trusted Third Parties.

Figure 7:
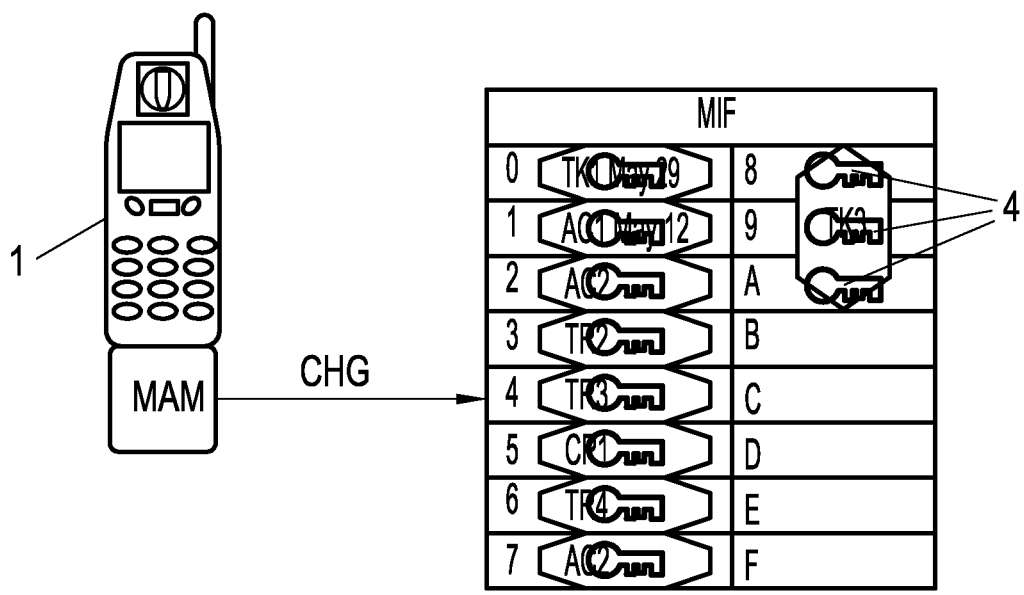
FIG. 7 shows a scheme of a third embodiment of the present invention.

According to the present invention the mobile communication device 1 is equipped with a memory device MIF that comprises a plurality of memory sectors (0-F), each memory sector being protected against unauthorized access by sector keys (see Key A and Key B in FIG. 3, or numeral 4 in FIG. 7). In the present embodiment of the invention the memory device MIF is a MIFARE Classic card (as shown in FIGS. 1 to 3) or an emulated MIFARE Classic device such as a SmartMX card. The Service Provider SP and the Mobile Network Operator MNO, respectively, provide NFC services requiring to download applications, here MIFARE applications, into the memory device MIF of the mobile communication device 1. As has been explained above download of applications is exclusively handled by the Trusted Service Manager TSM who receives the applications from the Service Provider SP and the Mobile Network Operator MNO and forwards them to the mobile communication device 1. It is the Trusted Service Manager who decides in which sectors of the memory device MIF the applications have to be written. The mobile communication device 1 comprises a software-implemented Trusted Service Manager Applet (not shown in the drawing) being responsible to carry out all instructions of the Trusted Service Manager. Particularly the Trusted Service Manager Applet writes the applications into the prescribed sectors of the memory device MIF. The applications comprise e.g. tickets, access controls and transit applications, but are not limited to said types of applications. Having a closer look at the memory device MIF it currently comprises the following applications:

Ticket 1 (TK1) in sector 0
Access Control 1 (AC1) in sector 1
Access Control 2 (AC2) in sector 2
Transit 2 (TR2) in sector 3
Transit 3 (TR3) in sector 4
Coupon 1 (CP1) in sector 5
Transit 4 (TR4) in sector 6
Access Control 3 (AC31) in sector 7
Ticket 3 (TK3) in sectors 8, 9 and A
sectors B, C, D, E, F remain empty.

For the explanation of the present invention it is assumed that the user 5 has realized that his mobile communication device 1 has been stolen. He reports the theft of his mobile communication device 1 to the Mobile Network Operator MNO (see arrow MSG). The Mobile Network Operator MNO block all basic network services for this mobile communication device 1. Further, the Mobile Network Operator MNO sends a request (arrow REQ) to the Trusted Service Manager TSM to discard all applications stored in the memory device MIF of the mobile communication device 1. Upon receipt of this request REQ the Trusted Service Manager establishes a connection with the mobile communication device 1 and especially with an application manager MAM residing as a software implementation within the mobile communication device 1. Preferably, the application manager MAM is located in a secure memory element (for instance the SIM card). The Trusted Service Manager TSM instructs (see arrow INS) the application manager MAM to disable all applications (TK1, AC1, AC2, TR2, TR3, CP1, TR4, AC3, TK3) that are stored in the memory device MIF being connected to the mobile communication device 1.

The application manager MAM can handle this disabling instruction INS in a plurality of alternative ways being discussed below.

Figure 5:
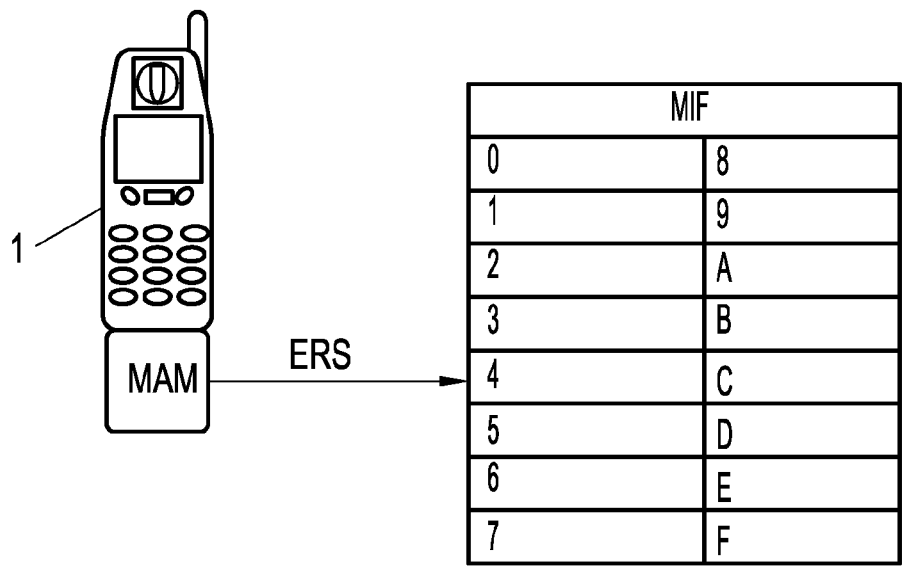
FIG. 5 shows a scheme of a first embodiment of the present invention.

A first application disabling procedure carried out by the application manager MAM is schematically shown in FIG. 5. This disabling method consists in physically erasing (symbolized by arrow ERS) all applications from the memory device MIF. This task can be accomplished by writing empty information into all the sectors of the memory device MIF. Application disabling by this erasing method is secure, since all the applications will be removed from the memory device MIF, but performance issues might arise. The new user of the mobile communication device 1 (i.e. in case of a stolen mobile the thief) could interrupt the erasing procedure by removing the battery of the device for example. Hence it is important to carry out disabling as fast as possible, in order to exclude interruption of the disabling procedure.

Figure 6:
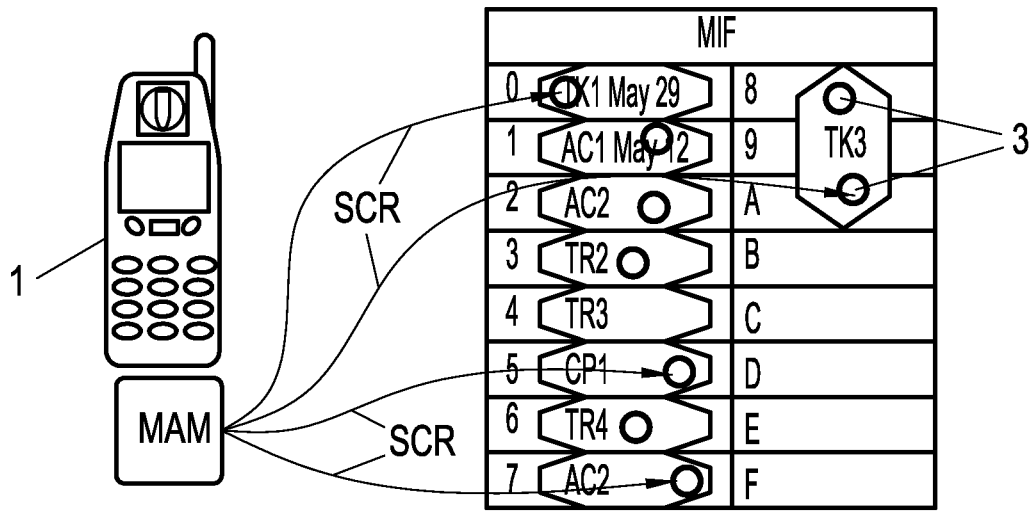
FIG. 6 shows a scheme of a second embodiment of the present invention.

FIG. 6 shows another way how the application manager MAM accomplishes disabling of the applications stored in the memory device MIF. This second disabling approach comprises disabling the stored applications by scrambling (symbolized by arrows SCR) the applications in the memory device MIF, preferably by writing random information 3 at random locations of the respective sectors of the memory device. In FIG. 6 the random information 3 is symbolized by spots being located within the applications. This disabling method is very fast but has the drawback that it is not completely safe. Some important data within the applications could remain in the memory device MIF since the applications are not completely removed from the memory device, although they are left in an unusable state after the disabling routine.

FIG. 7 shows a third disabling approach that combines both high processing speed and security. In this embodiment of the invention the application manager MAM disables the applications stored in the memory device MIF by means of changing (symbolized by arrow CHG) the sector keys 4 of the memory device MIF. This disabling method is fast, since just the sector keys have to be re-written (if MIFARE memory devices are used: the sector trailer), and 100% secure because all the sectors of the memory device will be un-accessible by terminal readers 2 (see FIG. 4) which only know the previous sector keys 4.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A mobile communication device capable of being secured when lost or stolen, the mobile communication device comprising:
   a memory device comprising a plurality of memory sectors, wherein at least one application is stored in at least one memory sector, wherein the memory sectors are protected against unauthorized access by sector keys; and
   an applications manager configured to disable the stored applications remotely by Near Field Communication (NFC) when triggered by an external trigger event received from an external source, wherein the applications manager disables the stored applications by changing the sector keys.

2. The mobile communication device as claimed in claim 1, wherein the memory device is a contactless smart card and the applications include at least one of tickets, coupons, and access controls.

3. The mobile communication device as claimed in claim 1, wherein the external trigger event is a disabling instruction sent from an external source to the mobile communication device.

4. The mobile communication device as claimed in claim 1, wherein disabling the stored applications further comprises erasing the applications from the memory device.

5. The mobile communication device as claimed in claim 4, wherein erasing the applications from the memory device further comprises rewriting the respective sectors of the memory device with empty information or random data.

6. The mobile communication device as claimed claim 1, wherein disabling the stored applications further comprises scrambling the applications in the memory device.

7. The mobile communication device as claimed in claim 1, wherein the mobile communication device is a mobile phone.

8. A method for disabling applications in a mobile communication device that is connected to a memory device comprising a plurality of memory sectors, wherein the method comprises:
   receiving a disable instruction; and
   remotely disabling by Near Field Communication (NFC) the stored applications when triggered by the disable instruction, wherein the step of remotely disabling the stored applications comprises changing the sector keys of the memory device, the memory sectors are protected against unauthorized access by sector keys, and each application is stored in at least one memory sector.

9. The method as claimed in claim 8, wherein the memory device is a contactless smart card and the applications are selected from the group consisting of tickets, coupons, and access controls.

10. The method as claimed in claim 8, wherein disabling instruction is sent from an external server to the mobile communication device.

11. The method as claimed in claim 8, wherein disabling the stored applications further comprises erasing the applications from the memory device.

12. The method as claimed in claim 11, wherein erasing the applications from the memory device further comprises rewriting the respective sectors of the memory device with empty information or random data.

13. The method as claimed in claim 8, wherein disabling the stored applications further comprises scrambling the applications in the memory device by writing random information at random locations of the respective sectors of the memory device.

14. A non-transitory machine-readable storage medium in the memory of a mobile communication device being connectable to a memory device comprising a plurality of memory sectors wherein at least one application is stored in at least one memory sector, wherein the non-transitory machine-readable storage medium comprises instructions for performing, when running on the mobile communication device:

receiving a disable instruction; and remotely disabling by Near Field Communication (NFC) the stored applications when triggered by the disable instruction, wherein the step of remotely disabling the stored applications comprises changing the sector keys of the memory device, and the memory sectors are protected against unauthorized access by sector keys.

15. The non-transitory machine-readable storage medium as claimed in claim 14, wherein the instructions are downloadable from a remote server via a communication network.

16. A telecommunication system comprising a Mobile Network Operator (MNO), a plurality of mobile communication devices according to claim 1 and a Trusted Service Manager, wherein the Trusted Service Manager is adapted to establish communication with a mobile communication device by request of the Mobile Network Operator and to instruct the mobile communication device to disable applications being stored in a memory device that is connected to the mobile communication device.

17. The mobile communication device as claimed claim 6, wherein disabling the stored applications further comprises writing random information at random locations of the respective sectors of the memory device.

18. The mobile communication device of claim 1, wherein the external source is a trusted services manager that securely distributes and manages the applications.

19. The method of claim 10, wherein the external server is a trusted services manager that securely distributes and manages the applications.

20. The method of claim 8, wherein the memory device is a contactless smart card.

* * * * *